United States Patent
Cook et al.

(10) Patent No.: US 6,800,713 B2
(45) Date of Patent: Oct. 5, 2004

(54) METHODS FOR MAKING SILICONE-ORGANIC COPOLYMERS

(75) Inventors: Leon Neal Cook, Midland, MI (US); Jodi Lynnette Jibben, Midland, MI (US); Kimmai Thi Nguyen, Midland, MI (US); Lenin James Petroff, Bay City, MI (US); Jay Brian Rose, Midland, MI (US); Julie Ann Hayes, Cary, NC (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 10/145,311

(22) Filed: May 15, 2002

(65) Prior Publication Data

US 2003/0105260 A1 Jun. 5, 2003

Related U.S. Application Data

(63) Continuation-in-part of application No. 09/903,920, filed on Jul. 12, 2001, now abandoned.

(51) Int. Cl.$^7$ .............................................. C08G 77/455
(52) U.S. Cl. ............................. 528/28; 528/25; 528/26; 528/31; 525/474; 525/479
(58) Field of Search ................................ 528/25, 28, 26, 528/31, 474, 479; 525/474, 479

(56) References Cited

U.S. PATENT DOCUMENTS

| | | | | |
|---|---|---|---|---|
| 3,892,643 | A | | 7/1975 | Tanaka et al. ......... 204/159.13 |
| 4,604,442 | A | | 8/1986 | Rich ............................ 528/28 |
| 5,981,680 | A | | 11/1999 | Petroff et al. ................. 528/26 |
| 6,051,216 | A | | 4/2000 | Barr et al. ..................... 424/78 |
| 6,281,286 | B1 | * | 8/2001 | Chorvath et al. ........... 524/862 |
| 6,451,295 | B1 | * | 9/2002 | Cai et al. ....................... 424/65 |
| 6,517,946 | B2 | * | 2/2003 | Shiono et al. ............. 428/450 |
| RE38,116 | E | * | 5/2003 | Petroff et al. ................. 528/26 |

FOREIGN PATENT DOCUMENTS

| | | | |
|---|---|---|---|
| EP | 0 295 561 A2 | 12/1988 | ........... C08G/73/10 |
| EP | 1 413 170 A2 | 2/1991 | ......... C08C/77/448 |
| WO | WO 97/36573 | 10/1997 | |
| WO | WO 99/06473 | 2/1999 | |

* cited by examiner

Primary Examiner—Jeffrey B. Robertson
(74) Attorney, Agent, or Firm—Alan Zombeck

(57) ABSTRACT

Methods for making silicone-organic copolymers are disclosed involving the manipulation of polymerization chain terminators allowing for polymer molecular weight control.

7 Claims, No Drawings

METHODS FOR MAKING SILICONE-ORGANIC COPOLYMERS

CROSS-REFERENCE

This application is a continuation in part of application Ser. No. 09/903,920, filed Jul. 12, 2001, now abandoned.

FIELD OF THE INVENTION

This invention relates to improved methods for making silicone-organic copolymers. More particularly, the invention relates to methods for making silicone-organic copolymers with molecular weight control and without the need for protecting groups on organofunctional silicone intermediates.

BACKGROUND OF THE INVENTION

Silicone-organic copolymers are widely used, notably in the preparation of personal care products. Methods currently known in the art for making these copolymers are often cumbersome, time consuming and expensive, if they work at all, as a great deal of care must be taken to insure that the properties of these materials meet the rigid specifications usually required, including high clarity and optimal strength. Industry is constantly seeking new materials in this class and improved ways of preparing them.

A recent effort in this regard is disclosed by Barr et al. in U.S. Pat. No. 6,051,216 and in the corresponding PCT Publication No. WO 99/06473. Siloxane based polyamides useful as cosmetic gelling agents are described therein, as well as methods to make these polymers. The methods therein have been found to be less than cost effective in most cases given the large number of difficult steps involved. For example, it is necessary to have protecting groups on some of the organofunctional siloxane intermediates that later have to be removed.

U.S. Pat. No. 5,981,680 to Petroff et al. is directed at an improved process to make the polyamides of Barr. Instead of reacting a protected organic acid with a siloxane before forming the amide linkage as in Barr, Petroff calls for forming the amide linkage before any reaction with siloxane, thus eliminating the necessity of using protecting groups.

A need still exists, however, for new silicone-organic copolymers and further improved methods of making silicone-organic copolymers. In particular, a need exists for new silicone-organic copolymers that have very specific molecular weights or ranges of molecular weights and for improved methods of making silicone-organic copolymers with molecular weight control. The present invention is directed to filling these needs.

SUMMARY OF THE INVENTION

It is an object of this invention to provide methods to make silicone-organic copolymers with molecular weight control. Thus, this invention relates to a method for making silicone-organic copolymers comprising: copolymerizing an organic component other than a diamide with a silicone component, where, at least a portion of at least one of these components has been processed as to chain terminators individually, or at least a portion of both components has been processed together as to chain terminators, such processing taking place at any point prior to completion of copolymerization.

The invention also relates to a method for making siloxane-based polyamides comprising: copolymerizing, in the presence of a catalyst, an SiH containing siloxane and a vinyl containing diamide in a combination in which the molar ratio of total chain terminators added to that of total pure diamide added is 1:99 to 3:97 and the molar ratio of total siloxane SiH added to total diamide vinyl added is 0.9:1 to 1.1:1.

Also in this regard is a method for copolymerizing silicone and organic reactants into a copolymer with molecular weight control, the method comprising: estimating a total amount of polymerization chain terminators needed to produce the copolymer of desired molecular weight under reaction conditions via a system model, processing at least a portion of at least one individual copolymerization reactant or at least a portion of a mixture comprising some or all copolymerization reactants such that the total amount of chain terminator present under reaction conditions is as estimated, and copolymerizing the silicone and organic reactants under reaction conditions. Further in this regard is a method for making silicone-organic copolymers in a reaction system with molecular weight control, the method comprising: providing a copolymer molecular weight set point to a model based controller, using the controller to determine a value for a variable or values for a set of variables corresponding to an effective amount of chain terminator in the reaction system and affecting a change or changes in the system with the aim that the value for the variable or values for the set of variables determined by the controller be obtained.

DETAILED DESCRIPTION OF THE INVENTION

The methods according to the present invention are directed to making silicone-organic copolymers. Suitable silicones include, but are not necessarily limited to, silanes, siloxanes and combinations thereof. Although often not considered to be silicones, silanes will be taken as such for the purposes of this disclosure and the claims that follow. Organics found to be suitable include, but are not necessarily limited to, nitrogen containing organics such as amides, urethanes, ureas, imides and combinations thereof.

Basically, the methods of the present invention can be understood as comprising the step of copolymerizing organic component(s) and silicone component(s), at least one of which has been processed, at least in part. Processing (as defined below) may be performed on only some or all of one or both of the individual reactants (even via additives) separately or in some combination. It is even possible that processing could take place simultaneously with copolymerization with or without any pre-polymerization processing. This processing can be accomplished by any suitable method known in the art for such purpose including vacuum stripping.

In the context of the methods of the present invention, processing should be understood as comprising, unless specifically indicated otherwise, the manipulation, including the addition and/or removal of impurities or other components that would act as chain terminators in polymerization. Chain terminator should be taken to refer to compounds or compositions that form a permanent covalent bond to the polymerization site on the growing polymer making chain growth from that site impossible, unless the terminator is removed; catalyst poisons would ordinarily not come under this definition, nor ordinarily would anything that was a mere reaction inhibitor (which could include something acting via its dilution effect). In the case of silicone-polyamides, terminators are typically omega-olefinic carboxylic acids and/or monoamide-monoamines. Omega-olefinic carboxylic acids may in fact facilitate some chain extension via their ability to react via hydrosilylation of their unsaturated functionality and via the silylation of the carboxylic acid portion of the molecule with a SiH group. This would result in a disruption in the intended growing polymer chain by the introduction of a Si—O—C linkage, which is readily hydrolyzable. If hydrolyzed, the Si—O—C linkage would break the polymer strand and result in a reduced and inconsistent molecular weight. The Si—O—C linkage is being defined as a transient chain extension and is why the omega-olefinic carboxylic acids are included in the above definition of chain terminator. Similarly, hydroxy-containing solvents, such as polypropylene glycol ether of myristyl alcohol, can potentially act as chain terminators via a silylation of the carbinol group with the SiH containing siloxane. The relative rate of this side reaction is slow when compared to a Pt catalyzed hydrosilylation reaction, and is therefore considered insignificant.

Surprisingly, it has been found that even small variations in the exact composition of components used to make silicone-organic copolymers (via impurities for the most part), especially the organic component(s), drastically affects the molecular weight of the resulting copolymers. Manipulation of this effect allows for the controlled synthesis of certain types of silicone-organic polymers of very particular molecular weight as was not possible before; this manipulation could include addition and/or removal of particular polymerization chain terminators. The ratio of silicone to organic during polymerization (particularly the molar ratio of silicone SiH to diamide vinyl in the case of certain silicone diamide polymerizations) may be additionally manipulated to enhance this control.

For purposes here, it should be understood that molecular weight control could refer to indirect control, direct control or both. Indirect control could result by any manipulation of chain terminators (and/or reactant ratio) while direct control involves a more deliberate and precise approach such as one involving a process model. Of course, there can be some overlap.

Organic component(s) can be synthesized directly by methods known in the art or can be obtained from commercial sources as available. The same is true for the silicone component(s).

It has been found that colored species present as contaminants in the organic component(s) (especially) may carry over into the final copolymer. If the copolymer is to be used in applications where such color is undesirable, it has been determined that it is probably easiest to remove these species sooner rather than later. This may mean that organic components(s) are purified before copolymerization or the materials used to make the organics are pre-purified. Such purification may be accomplished by any method known in the art to be suitable such as recrystallization or distillation.

It is usually preferred that a catalyst be used for the polymerization. Specific examples are discussed at other points in this disclosure.

Polymerization may be performed in the presence of a solvent or solvents, but solventless systems have been found to produce excellent results. It should be understood that in this disclosure and the claims that follow that "solventless" means the absence of solvent other than any residual solvent such as that added as part of a catalyst or reactant formulation. In any case, reaction systems containing less than 1.0 weight percent solvent, regardless of source, will be taken as solventless; for this purpose, catalyst itself and reactants themselves (as opposed to any carriers) are not solvents.

Generally, polymerization can be carried out batchwise or continuously.

Of great practical interest is the application of the methods of the present invention to the making of certain siloxane-based polyamides including the compositions of the present invention and those described in U.S. Pat. No. 6,051,216 to Barr et al. and U.S. Pat. No. 5,981,680 to Petroff et al., the disclosures of which are hereby incorporated by reference as to compositions. These polyamides are (at least for the most part) included in the family of polyamides comprising units of the following structure (to which the methods of the present invention apply generally):

Formula A

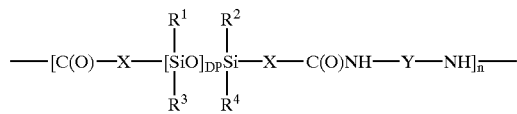

where:
(1) DP is selected from the group consisting of 1–700, preferably 15–500, and more preferably 15–45. In this context, DP represents an average value for degree of polymerization of the siloxane units as shown in Formula A with this average being a number average based on all the siloxane segments in all units of Formula A in the material considered. Of course, variation in "individual" DP values is still possible.
(2) n is a number selected from the group consisting of 1–500, particularly 1–100, and more particularly 4–25;
(3) X is a divalent, aliphatic hydrocarbon group having 1–30 carbons, particularly 3–10 carbons, and more particularly 10 carbons;
(4) Y is
  (a) a divalent hydrocarbon group having 1–40 carbons, particularly 1–20 carbons, more particularly 2–6 carbons, and especially 6 carbons, wherein
  the hydrocarbon group itself may optionally and additionally be substituted by at least one member selected from the group consisting of (i) hydroxy; (ii) a C3–C8 cycloalkyl; (iii) 1–3 members selected independently from the group consisting of C1–C3 alkyls and phenyl optionally substituted by 1–3 members selected independently from the group consisting of C1–C3 alkyls; (iv) a C1–C3 hydroxy alkyl; and (v) a C1–C6 alkyl amino, and
  the hydrocarbon group may optionally and additionally contain at least one of (i) 1–3 amide linkages; (ii) a C5 or C6 cyclic, divalent, saturated hydrocarbon group; and (iii) a phenylene optionally substituted by 1–3 members selected independently from the group consisting of C1–C3 alkyls, or
  (b) $R^{20}T(R^{21})R^{22}$, where $R^{20}$ and $R^{22}$ are divalent C1–C10 hydrocarbon groups and $R^{21}$ is a monovalent or divalent C1–C10 hydrocarbon group, such groups being independent of one another, and T is C(R), where R is selected from hydrogen, $R^1$, $R^2$, $R^3$, $R^4$, or a trivalent N, P or Al; the divalencies and trivalencies herein should be understood and taken to allow for branching, cross linking or the like in certain instances and as appropriate; and
(5) Each of $R^1$–$R^4$ is independently selected from the group consisting of methyl, ethyl, propyl, isopropyl, a siloxane chain (such as a polydimethylsiloxane or a siloxane based polyamide), and phenyl, wherein the phenyl may optionally be substituted at 1–3 positions by substituents independently selected from the group consisting of methyl and ethyl; more particularly, each of $R^1$–$R^4$ is selected from methyl and ethyl and especially methyl.

In this context, in this disclosure and the claims that follow, certain variations should be understood as possible, and in the case of the claims as included, unless otherwise noted. The individual values for X, Y, DP, and $R^1$–$R^4$ may be the same or different for each unit of the polyamide (which may include variations in values between any of the n subunits of Formula A). Such variation may or may not also exist for the X's within each of the n subunits of Formula A. Individual Y's may be aliphatic, aromatic or both.

At least when used in reference to Formula A, unless otherwise indicated, the term "siloxane group" refers to a group having siloxane units such as:

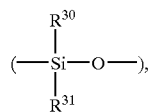

where, $R^{30}$ and $R^{31}$ are each independently selected from the group consisting of organic moieties, and each of $R^{30}$ and $R^{31}$ are connected to the silicon by a carbon-silicon bond. Further, at least in the context of Formula A, the carbon numbers stated for the X and Y do not include the carbons in the optional segments or substitutions. Also, the polyamides must have a siloxane portion in the backbone and optionally may have a siloxane portion in a pendant or branched portion.

If repeated with no variations in the defined variables, Formula A is representative of a linear homopolymer. Acceptable variations of the invention include: (1) polyamides in which multiple values of DP, X, Y, and $R^1$–$R^4$ occur in one polymeric molecule (which may include variations between the n subunits of Formula A and even within for X's), wherein the sequencing of these units may be alternating, random or block; (2) polyamides in which an organic triamine or higher amine such as tris(2-aminoethyl) amine replaces the organic diamine in part, to produce a branched or cross linked molecule; and (3) physical blends of any of (1) and (2) and/or linear homopolymers.

Suitable examples of amides for incorporation into polyamides (of Formula A, I or others) by the methods of the present invention include those that can be formed from omega-olefinic carboxylic acids and linear alkyl diamines. Examples of olefinic acids useful for such purpose include acrylic acid, 3-butenoic acid, 4-pentenoic acid and 10-undecylenic acid. Useful diamines include ethylene diamine, hexamethylene diamine, decamethylene diamine, and although not an alkyl diamine, phenylene diamine. Examples of siloxanes for incorporation into polyamides by the methods of the present invention include dimethylhydrogen end blocked polydimethyl siloxanes.

Of special interest is the application of the methods of the present invention to form the certain polyamides. A high degree of control is required to produce these polyamides, and the methods of the present invention provide such control and in a cost effective fashion.

In one particular embodiment of the methods of the present invention, a siloxane based polyamide is prepared, the method comprising:

(1) optionally purifying an omega-olefinic carboxylic acid by distillation or other suitable method to remove impurities that may include colored species;

(2) reacting an omega-olefinic carboxylic acid or the product of (1) with a diamine so as to form a vinyl terminated diamide;

(3) processing the product of (2) to remove, to a set level or below some set level (as determined by experience or a system model as discussed below), species that act as chain terminators in the copolymerization of siloxanes and diamides by using a suitable method such as vacuum distillation;

(4) optionally storing the product of (3) in an inert atmosphere (such as under nitrogen), at least until the material has cooled to less than 30 degrees C., which is believed to help to prevent oxidation and/or colorization prior to copolymerization; and (5) copolymerizing the product of (3) or optionally of (4) with an SiH containing siloxane.

Of course, it might be possible to start with a purchased version of the organic product of any of steps (1), (2), (3) or (4) or some equivalent and short cut this method. Other possible alternatives include removal of chain terminators at other than step (3), introduction of chain terminators anywhere in the overall process, performing either of these operations at multiple points, or some combination of these.

In the silicone-diamide system generally, polymerization chain terminators include, but are not limited to, residual carboxylic acid (from step (2) above and/or a purchased equivalent) and monoamide. (Monoamide is defined for this purpose as a material in which only one of the amine groups present in the diamine species has reacted with an omega olefinic acid and resulting in a monovinyl functional monoamine/monoamide). These chain terminators are typically found as impurities in the reaction product of step (2) above or equivalents.

It has been found that if undecanoic and/or palmitic acid are added during the synthesis of the diamide, a chain terminator is formed from the diamine and either or both of these acids, since these acids act as "endcappers". That is, an end capped diamide (vinyl only on one end) is produced that will act as a chain terminator in silicone polyamide synthesis generally; diamide produced with no vinyl is neither a terminator nor a chain extender and production of it should (usually) be limited by using excess unsaturated acid or other means. Any saturated fatty acid may be used as an endcapper, preferably C10–C16 acids.

The total chain terminator level is probably more significant than that of any individual terminator. Overall, it is usually preferred that total chain terminators in the siloxane-polyamide system (most often residual omega-olefinic carboxylic acid and monoamide) range from 1.0–3.0, especially 1.5–2.5 and most especially 1.8–2.2 mole percent of the diamide (or based on the diamide) on average as used in the polymerization. These ranges are alternatively expressed in terms of molar ratios of the total chain terminators to total pure diamide in the diamide material used in the polymerization: 1:99 to 3:97, 1.5:98.5 to 2.5:97.5 and 1.8:98.2 to 2.2:97.8.

In batch systems, the ranges and ratios of the preceding paragraph, relating chain terminators to diamide (as well as the ratios to follow relating SiH to vinyl) should be understood as based on totals of materials added to the system up to the end of copolymerization (loosely referred to perhaps as "during" the copolymerization). For continuous systems, the situation should be understood as based on total added to the reaction zone during the retention time in this zone. In either case, it is preferable that materials be added in a consistent proportion (especially stoichiometric) and in continuous systems that reactants (and anything else to be added) be added at the front end of the reaction zone and/or the reaction be run at or near a steady state.

An acceptable range for carboxylic acid content for the copolymerization mixture in silicone polyamide synthesis by methods such as the present embodiment is expressed in terms of the "acid number" (gram equivalents of KOH per kilogram of diamide) is 0.03–2.2, with a preferred range being 0.50–1.00 and a more preferred range being 0.60–0.80. The levels of monoamide may be determined by Electron Spray Ionization Mass Spectrometry as were those reported herein with an acceptable range being 0.9 to 1.1 mole percent based on the diamide.

Although not a chain terminator by the definition used herein, residual diamine may poison or partially inactivate catalysts routinely used, as can even residual monoamide-monoamine (which is a chain terminator). An acceptable range expressed in terms of the "base number" (gram equivalents of HCl per kilogram of diamide added to the polymerization mixture) is 0.0 to 0.2, with a preferred range being 0.0–0.1 and a more preferred range being 0.0–0.05. Higher values may be tolerable in any case. "Base number" values will necessarily include some of the monoamide present, but not all monoamide is detected this way.

In the formation of the diamide, it is usually preferred to use at least a slight excess of acid as diamines tend to have quite unpleasant smells and are catalysts poisons as previously stated and can carry over into the product polymer.

For siloxane based polyamide synthesis, such as illustrated in the present embodiment, it is preferred that a linear siloxane with an SiH group on each end be used as a reactant, although alternatives are often acceptable. Presence of siloxane SiH at least somewhere in the reactants is contemplated (as this polymerization is basically a hydrosilylation). It is of note that a siloxane with an SiH group on only one end (at least before addition of any diamide) is itself partially chain terminated, and it could act as a chain terminator by binding to a vinyl end of a growing polyamide chain. Allowance would have to be made for any non-preferred variations in process modeling.

It is preferred that the diamide be linear with a terminal vinyl group (carbon-carbon double bond) on each end, although alternatives are sometimes acceptable. Presence of diamide vinyl somewhere in the reactants is contemplated (as this polymerization is basically a hydrosilylation). It is of note that a diamide with a single, vinyl group (at least when terminal) will act as a chain terminator. Polymerizations with catalysts described herein where non-terminal vinyl diamide is used and polymerization without catalyst regardless of vinyl location have been ordinarily noted to proceed extremely slowly if at all. As with the siloxane, allowance would have to be made for any non-preferred variations in process modeling.

It has been found in silicone polyamide synthesis generally that as the molar ratio of the silicone SiH and diamide vinyl approaches 1:1 from either direction, at a set level of chain terminators, the molecular weight of the resulting copolymer increases. It is preferred that this ratio be 0.9:1.1, especially 0.95:1.05 and most especially 0.99 to 1.01.

Overall, it is usually preferred to control both chain terminators and reactant ratio in siloxane based polyamide synthesis in particular and in silicone organic copolymerization in general.

For many applications and/or corresponding compounding processes, siloxane polyamides of a weight average molecular weight range of about 80,000–150,000 atomic mass units (with subunit siloxane number average DP of 12–18) are usually preferable, in that those below this range are too brittle, while those above are too viscous for common processing methods to be effective. Manipulation of levels of chain terminators and ratio of copolymerization reactants makes rather precise control of molecular weight of the final copolymer possible.

It is usually preferred that a catalyst be used in silicone diamide copolymerization. For siloxane diamide copolymerization, any of the catalysts known in the art to be suitable for such reaction can be employed, such as those based on a Group VIII transition metal, a noble metal. The platinum based catalysts falling in this class are preferred. Most preferred are platinum-silicone based catalysts of this same class.

Such noble metal catalysts are described in U.S. Pat. No. 3,923,705, incorporated herein by reference to show such catalysts. One preferred platinum catalyst is Karstedt's catalyst that is described in U.S. Pat. Nos. 3,715,334 and 3,814,730, which are incorporated herein by reference as to this catalyst. Karstedt's catalyst is a platinum divinyl tetramethyl disiloxane complex typically containing about one weight percent platinum in a solvent such as toluene. Another preferred platinum catalyst is a reaction product of chloroplatinic acid and an organosilicon compound containing terminal aliphatic unsaturation as described in U.S. Pat. No. 3,419,593, incorporated herein by reference as to this catalyst. Most preferred as the catalyst is a neutralized complex of platinous chloride and divinyl tetramethyl disiloxane, for example, as described in U.S. Pat. No. 5,175,325, and incorporated by reference as to this description.

Temperature of the copolymerization is not critical, but it is preferred that it be high enough so that the reactants are melted, will dissolve or are miscible (at least in most siloxane polyamide systems) but not so high that appreciable isomerization of the omega double bond in the acid incorporated into the diamide occurs.

Solvent may be used but is not absolutely required. At least in siloxane polyamide systems, toluene and xylene have been found to be suitable and virtually interchangeable solvents but must be removed (such as by stripping) when the polymers are to be used in many applications because of odor, health and/or environmental regulations or concerns. Decamethylcyclopentasiloxane and phenyl tris (trimethylsiloxy) silane are possible alternatives in such case, but also generally. Similarly, polypropylene glycol ethers of linear alcohols (such as those of myristyl alcohol) may also be used; although these ethers do appear to inhibit reaction when used in high concentration, they typically do not act as chain terminators as defined herein. Examples of these ethers include PPG-3 myristyl ether and PPG-4 myristyl ether.

This listing of solvents is not exhaustive. Hydrocarbons and low viscosity silicones (at least those of viscosity less than 50 cSt or 50 mm$^2$/s, as measured conventionally) are suitable generally.

Solventless processes are possible. When solvents are omitted, siloxane based polyamides of high molecular weight with nearly clear appearance and low color can be made when there is sufficient mixing during polymerization. Solventless should be understood as including situations wherein residual solvent may be introduced, for example, as part of a catalyst preparation; this may also be referred to as a situation where no additional solvent is present. Definition of solventless systems has been given previously for the general case of silicone organic copolymerization and applies here in the case of siloxane based polyamide synthesis.

Many other specific embodiments of the methods of the present invention are apparent from the preceding disclosure. An important one is a method for making siloxane-based polyamides comprising: copolymerizing, in the presence of a catalyst, an SiH containing siloxane and a vinyl containing diamide in a combination in which the molar ratio of total chain terminators added to that of total pure diamide added is 1:99 to 3:97 and the molar ratio of total siloxane SiH added to total diamide vinyl is 0.9:1 to 1.1:1. Of course, the other ranges (as given above) for both of these ratios can be used, instead of those given here, as well as any combinations of any of these ratio pairs.

Here, as elsewhere in this disclosure and the claims that follow, "diamide" refers to a material made of actual diamide and any impurities carried along with it, which may include chain terminators. "Pure diamide" refers only to the portion of this material that is actually structurally a diamide, but excludes any structural diamide that is also a chain terminator, such as an endcapped diamide (monovinyl) as described previously, or a diamide that is not a chain terminator nor a chain extender such as a diamide without any vinyl group. Also in this context, throughout this disclosure and the claims that follow, "added" should be understood to mean placed in the polymerization reaction mixture at any point during which polymerization is taking place (expressed more precisely perhaps as up to the end of polymerization) for batch systems, and correspondingly, that placed in the reaction zone during the retention time of this zone in continuous systems.

Other silicone-organic copolymers besides silicone-polyamides can be produced similarly according to the methods of the present invention. Generally, this involves obtaining or the initial preparation of the appropriate terminal vinyl or end blocked organic intermediate then the reaction of this intermediate with a silicone using a platinum or other suitable catalyst. The level of polymerization chain terminators would be adjusted, controlled or selected somewhere in the process.

For example, certain silicone based polyurethanes may be prepared by the methods of the present invention as follows. A vinyl or allyl end blocked urethane is first obtained or is prepared by reacting an unsaturated monofunctional alcohol (such as allyl alcohol, methallyl alcohol, hydroxybutyl vinyl ether or 3-butene-2-ol) with a diisocyanate (such as toluene diisocyanate (TDI) or diisocyanate-diphenyl methane (MDI)). Typically a tin catalyst is used to facilitate this reaction. The resulting di-unsaturated urethane is then reacted, optionally in an appropriate solvent, with a silicone (such as a dimethylhydrogen end blocked polysiloxane) in the presence of a catalyst to form the final silicone-urethane copolymer. Manipulation of the level of polymerization chain terminators is performed at one or more points during this process, such manipulation is performed prior to procurement of the urethane for polymerization or both.

Certain silicone-based polyureas can be prepared similarly. Instead of an alcohol, an unsaturated monofunctional amine such as allyl amine is used to make the organic intermediate.

Mathematical models that predict the molecular weight of polymers made according to the methods of the present invention would be useful. In another embodiment of the methods of the present invention, such models are used in the control of the product polymer's molecular weight. Models for this purpose may be empirical, theoretical or some combination thereof.

As an example, an empirical model might be developed based on the observation that in the systems relating to the present invention, molecular weight of the product polymer and amount of chain terminators present in the reaction mixture used to make this polymer are inversely related. An improvement would likely result if the fact that the product molecular weight also varies with the ratio of reactants, or correspondingly with the level of excess of one reactant over another, was included. These relationships can be expressed using general functional relationships of the form z=f(x), z=f(y), z=f(x,y), etc. An accurate model should reflect that the molecular weight of the product polymer should approach infinity as both the amount of chain terminators and excess reactants approach zero.

A corresponding theoretical or semi-theoretical model for silicone-organic polymerization product number average molecular weight can be developed as follows. By definition, given the components in the systems in question, the number average molecular weight of the raw polymer product mixture ($MW_n$) is given by:

$$MW_n = \frac{(n_{silicone})(MW_{silicone}) + (n_{organic})(MW_{organic})}{(n_{system})} \quad (I)$$

where, $n_{silicone}$=number of moles of silicone intermediate $MW_{silicone}$=the weight average molecular weight of the silicone intermediate $n_{organic}$=number of moles of organic intermediate $MW_{organic}$=the weight average molecular weight of the organic intermediate $n_{system}$=number of moles of molecules in the raw polymer product mixture.

In this context, "intermediate" should be taken to refer to the precursor to a portion of a structure such as that shown, for example, the siloxane or diamide residue in Formula I above.

Assuming full conversion during polymerization (based on any limiting intermediate), that polymerization can take place at any reactive end of a growing polymer chain (each chain taken as having two ends) and also assuming that chain terminators will bond at any reactive end of these chains ending chain growth at that site, it follows that $n_{system}$ is given by:

$$n_{system} = \tfrac{1}{2}(n_{excess} + n_{terminator}) \quad (II)$$

where, $n_{excess}$=number of moles of excess silicone or organic intermediate $n_{terminator}$=number of moles of chain terminators Substituting equation (II) into (I) and rearranging produces equation (III):

$$MW_n = (2)(n_{silicone})(MW_{silicone}) + \frac{(n_{organic})(MW_{organic})}{(n_{excess} + n_{terminator})} \quad (III)$$

Simplification in the numerator of equation (III) yields equation (IV):

$$MW_n = (2)(mass_{silicone}) + \frac{(mass_{organic})}{(n_{excess} + n_{terminator})} \quad (IV)$$

where, $mass_{silicone}$=mass of silicone intermediate in reaction system mass$_{organic}$=mass of organic intermediate in reaction system It is of note that the weight average molecular weight is equal to the product of polydispersity and number average molecular weight. Variations on this model are easily derived to cover cases where multiple silicone and/or organic intermediate types are used. One simple handling for the latter case would be to consider the silicone and organic related variables as lumped variables and lump all the (reactive) silicones and (reactive (organics) accordingly.

Of course, the models presented herein and variations on them could be manipulated in various ways apparent to those of ordinary skill in the art so as to enhance their practical applicability. For example, the equations for $MW_n$ could be solved for $n_{excess}$ or $n_{terminator}$ and used to determine levels of excess or terminator that would produce a polymer of given $MW_n$ (values for all other variables in the equation being given).

As it may actually be easier to obtain highly purified intermediates than to measure terminators in individual lots of these compounds, one desiring to practice the methods of the present invention could use the models herein to determine the amount of terminator needed to produce a polymer of a specified molecular weight and simply add this amount of terminator to at least a portion of it to an individual high purity reactant or a mixture of reactants to get the desired result. Of course, it would be possible to blend intermediates of varying purity for similar overall results.

It would also be possible to gradually add chain terminators as well as other components to the reaction mixture while reaction is taking place, at least in many cases, if allowance is made for the rate of reaction. In the model above and the corresponding claims that follow, component amounts are taken as total added to the reaction system at any time during polymerization (or perhaps more precisely prior to end of polymerization) in batch systems, or total added to the reaction zone during the retention time in that zone in continuous reaction systems. The above model's accuracy depends, at least in part, upon how much error results from assuming that no correction relating to reaction kinetics is required in this system.

In addition, it is expected that those of ordinary skill in the art could derive enhancements to the models presented based on experience with particular systems. For example, it might be desirable to develop a correction factor for MWn as the excess of one of the intermediates increases so as to obtain a value more reflective of the actual polymers produced.

A further embodiment of the methods of the present invention would thus be a method for copolymerizing silicone and organic reactants into a copolymer with molecular weight control, the method comprising: estimating a total amount of polymerization chain terminators needed to produce the copolymer of desired molecular weight under reaction conditions via a system model, processing at least a portion of at least one individual copolymerization reactant or at least a portion of a mixture comprising some or all copolymerization reactants, such that the total amount of chain terminator present under reaction conditions is as estimated, and copolymerizing the silicone and organic reactants under reaction conditions. It should be understood that processing and copolymerizing in this embodiment could be simultaneous.

An example of a system model would be one using equation (III), (IV), a rearranged version of either equation, a version of either equation for which any variable(s) has been substituted with an equivalent variable(s), or some combination of these. Such a model would be referred to as "based" on equation (III) or (IV), and the word "based" should be taken to mean at least this when used in the same context in the claims that follow.

Similarly, another embodiment of the methods of the present invention would be a method for making silicone-organic copolymers in a reaction system with molecular weight control, the method comprising: providing a copolymer molecular weight set point to a model based controller, using the controller to determine a value for a variable or values for a set of variables corresponding to an effective amount of chain terminator in the reaction system; and affecting a change or changes in the system with the aim that the value for the variable or values for the set of variables determined by the controller be obtained. One such variable and change could be related to stripping temperature of copolymerization reactants. The controller could be based on the system model given previously (equation (III) or (IV)) and could be fully automatic, partially automatic or fully manual. Herein, "effective amount" in this context would refer to the amount of chain terminator predicted by the model corresponding to the desired molecular weight of the polymer.

Throughout this disclosure and the claims that follow, it should be understood that the term "molecular weight" (MW) refers to the weight average molecular weight, unless stated otherwise. Both weight and number average molecular weights (the latter, $MW_n$) should be taken as expressed in atomic mass units, unless otherwise specified. Those reported herein were, unless otherwise stated, determined by gel permeation chromatography.

Further, the term "copolymer" should not be taken in its most restrictive sense unless so stated; that is, the term should not be taken as limited to a polymer made from only two but rather from at least two distinct monomers (intermediates).

In addition, the viscosity measurements given herein, unless otherwise stated or apparent from the units given, are melt viscosities made using a Brookfield Digital Viscometer Model HATDV-II, Brookfield Thermosel, and #27 Spindle at 140 deg C. In the examples and comparative examples, viscosities refer to the silicone based polyamides, unless otherwise indicated.

As to the examples and comparative examples that follow, chain terminators were taken as free carboxylic acids, monoamides, and where applicable, "endcapped" diamides (monovinyl). Although other chain terminators could be present in such polymerization systems generally, in the examples and comparative examples, materials were controlled such that the presence of other chain terminators would be negligible at most (and those considered limited to coming from the diamide). Free carboxylic acids were determined via titration with KOH. Monoamide content was determined by Electron Spray Ionization Mass Spectroscopy, unless otherwise indicated. End capped diamides were determined indirectly by controlled doping of diamides (using a known excess of unsaturated acid in diamide versus saturated acid), but could be determined by methods known generally in the art relating to such materials.

The methods of the present invention are useful to prepare siloxane-based polyamides comprising the following structure:

Formula I

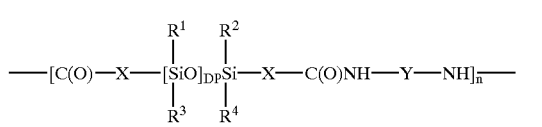

where:
(1) DP is 10–50, preferably 10–30, more preferably 12–18 and especially 15. In this context throughout this disclosure and the claims that follow, DP represents an average value for degree of polymerization of the siloxane units as shown in Formula I with this average being a number average based on all the siloxane segments in all units of Formula I in the material considered. Of course, variation in "individual" DP values is still possible.
(2) n is 45 or greater, limited only by the viscosity maximum of the mixer or extruder or other equipment employed to make the polymer. Commonly, this maximum is reached at an n value of 200. Preferably n is 55–125 and more preferably 60–80;
(3) X is a divalent, aliphatic hydrocarbon group having 1–30 carbons, preferably 3–10 carbons, and more preferably 10 carbons;
(4) Y is
   (a) a divalent hydrocarbon group having 1–40 carbons, preferably 2–10 carbons, and more preferably 6 carbons, wherein
      the hydrocarbon group itself may optionally and additionally be substituted by at least one member selected from the group consisting of (i) hydroxy; (ii) a C3–C8 cycloalkyl; (iii) 1–3 members selected independently from the group consisting of C1–C3 alkyls and phenyl optionally substituted by 1–3 members selected independently from the group consisting of C1–C3 alkyls; (iv) a C1–C3 hydroxy alkyl; and (v) a C1–C6 alkyl amino, and
      the hydrocarbon group may optionally and additionally contain at least one of (i) 1–3 amide linkages; (ii) a C5 or C6 cyclic, divalent, saturated hydrocarbon group; and (iii) a phenylene optionally substituted by 1–3 members selected independently from the group consisting of C1–C3 alkyls, or
   (b) $R^{20}T(R^{21})R^{22}$, where $R^{20}$ and $R^{22}$ are divalent C1–C10 hydrocarbon groups and $R^{21}$ is a monovalent or divalent C1–C10 hydrocarbon group, such groups being independent of one another, and T is C(R), where R is selected from hydrogen, $R^1$, $R^2$, $R^3$, $R^4$, or a trivalent N, P or Al; the divalencies and trivalencies herein should be understood and taken to allow for branching, cross linking or the like in certain instances and as appropriate; and
(5) Each of $R^1$–$R^4$ is independently selected from the group consisting of methyl, ethyl, propyl, isopropyl, a siloxane containing chain (such as a polydimethylsiloxane or a siloxane based polyamide), and phenyl, wherein the phenyl may optionally be substituted at 1–3 positions by substituents independently selected from the group consisting of methyl and ethyl; more particularly, each of $R^1$–$R^4$ is selected from methyl and ethyl and especially methyl.

In this context, in this disclosure and the claims that follow, certain variations should be understood as possible, and in the case of the claims as included, unless otherwise indicated. The individual values for X, Y, DP, and $R^1$–$R^4$ may be the same or different for each unit of the polyamide (which may include those between any of the n subunits of Formula I). Such variation may or may not also exist for the X's within each of the n subunits of Formula I. Individual Y's may be aliphatic, aromatic or both.

At least when used in reference to Formula I, and unless otherwise indicated, the term "siloxane group" refers to a group having siloxane units such as:

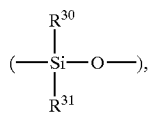

where, $R^{30}$ and $R^{31}$ are each independently selected from the group consisting of organic moieties, and each of $R^{30}$ and $R^{31}$ are connected to the silicon by a carbon-silicon bond. Further, at least in the context of Formula I, the carbon numbers in X and Y do not include the carbons in any optional segments or substitutions. Also, the polyamides must have a siloxane portion in the backbone and optionally may have a siloxane portion in a pendant or branched portion.

If repeated with no variations in the defined variables, Formula I is representative of a linear homopolymer. Acceptable variations of the invention include: (1) polyamides in which multiple values of DP, X, Y, and $R^1$–$R^4$ occur in one polymeric molecule (which may include variation between the n subunits of Formula I and even within for X's), wherein the sequencing of these units may be alternating, random or block; (2) polyamides in which an organic triamine or higher amine such as tris(2-aminoethyl) amine replaces the organic diamine in part, to produce a branched or cross linked molecule; and (3) physical blends of any of (1) and (2) and/or linear homopolymers.

Suitable examples of diamides for incorporation into polyamides of the present invention include those that can be formed from omega-olefinic carboxylic acids (such as those made up of a 2, 3, 4 or 10 carbon chain, which may be linear, in addition to the carboxyl group) and alkyl diamines (such as those made up of a carbon chain containing 2, 6 or 10 carbons, where such chain may be linear, saturated or both, in addition to two amino groups at various positions). These would correspond to X groups of 2, 3, 4 or 10 carbon length that may be linear (such as —$(CH_2)_m$—, where m=2, 3, 4 or 10) and Y groups of 2, 6 or 10 carbons that may be linear, saturated or both (such as —$(CH_2)_m$—, where m=2, 6 or 10), respectively.

Examples of olefinic acids useful for such diamide formation include acrylic acid, 3-butenoic acid, 4-pentenoic acid and 10-undecylenic acid. Useful diamines include ethylene diamine, hexamethylene diamine, and decamethylene diamine; phenylene diamine, although not an alkyl diamine, is also useful.

Note that throughout this disclosure and the following claims, reference to carboxylic acids or carboxyl groups should be taken to include corresponding carboxylates as appropriate.

Suitable examples of siloxanes for incorporation into the polyamides of the present invention include dimethylhydrogen end blocked polydimethyl siloxanes, especially those with a number average DP of 10–30, notably 12–18 and most notably 15. DP's for end blocked siloxanes should be taken as ignoring end blocking groups, unless otherwise noted.

The methods of the present invention can be used to prepare silicone organic polymers useful in many applications, notably in personal care products, such as deodorants and antiperspirants. It has been found that among the compositions prepared by the methods of the present invention, those derived from the copolymerization of the diamide formed by reacting 10-undecylenic acid and hexamethylene diamine with a dimethyl end blocked polydimethylsiloxane of DP 10–30, especially 12–18 (and notably 15), such that the resulting polymer has 55–125 (and especially 60–80) diamide siloxane units per molecule on average (n is 55–125, especially 60–80, in Formula I) and a weight average molecular weight of 80,000–150,000 atomic mass units, especially 100,000–130,000 atomic mass units, make gellants with excellent properties for use in stick deodorants and antiperspirants. These polyamides would be based on the structure:

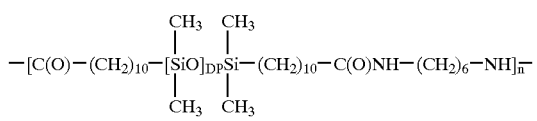

It should be understood that the disclosure of ranges herein should be taken not only to disclose the range itself but also anything subsumed therein, as well as endpoints. For example, disclosure of a range of 1–10 should be understood to disclose not only the range of 1–10, but also 1, 2.7, 9 and 10 individually, as well as any other number subsumed in the range. Similarly, disclosure of a range of C1 to C5 hydrocarbons should be understood to disclose not only C1 to C5 hydrocarbons as a class, but also C1, C2, C3, C4 and C5 hydrocarbons individually.

EXAMPLES

Titles given for the examples should not be interpreted as limiting in any way.

Example 1

Preparation of Materials

The following is the method that was used to prepare the diamides and copolymers of the examples. Any deviations from this method are noted specially in the specific example that follows as applicable.

Diamide Synthesis

A 1000 ml round bottom flask equipped with a thermometer, electrical stirrer, nitrogen sweep, and a condenser was charged with 153.5 g of 70 weight percent hexamethylene diamine in water ("HMDA") from Dupont and 346.5 g of purified 10-undecylenic acid ("UDA"). The purified UDA was the overhead produced by vacuum distillation of UDA from CasChem Corporation at about 180–210° C. and 10–20 mm Hg vacuum; this initial purification removed color producing impurities that would otherwise carry over into final products.

With the mixer off, the mixture in the flask was purged with nitrogen for about 5 minutes to sweep out any oxygen in the headspace. The reactants were initially immiscible and water clear, but the mixture quickly turned a light yellow color as soon as the mixer was turned on which initiated the reaction. The acid and base reacted to form an acid-base salt, and a temperature rise as high as 60° C. was observed due to the exothermic nature of the reaction.

The resulting mixture was then heated to 120° C. and maintained at this temperature for about 1 hour to slowly remove the water that was originally introduced in the reaction mixture as part of the HMDA solution. The slow removal of the water during this step was essential to maintaining the stoichiometric ratio of the raw materials, since they have different vapor liquid equilibrium.

Next, the material was heated to 160° C., and the diamide (N,N'-Hexamethylenebis(10-undecenamide)) was produced with water as the reaction by-product. The reaction was allowed to continue at this temperature for 1 hour or until water was no longer detected in the condenser trap indicating the reaction was completed. The materials were then further heated to about 240° C. and held there for two hours under vacuum with a nitrogen purge to strip out impurities.

Preservation of the Diamide

The above reaction mixture was cooled to about 150° C. and processed into a flake form. The flake was cooled to below 30° C. in an inert atmosphere to prevent the diamide from darkening from a cream to a brown color that would carry over to any polyamide made from this material. The inert atmosphere is theorized (without limitation as to this invention) to prevent the formation of colored oxidative by-products of the diamide material as it cools.

Co-Polymerization of the Diamide and Silicone

A 500 ml, three neck, round bottom flask equipped with a temperature probe, an electrical stirrer, and a condenser was charged with 50 grams of the preserved diamide and 100 grams of xylene and heated to 115° C. for about 15 minutes to dissolve the diamide. About 143 grams of an equilibrated dimethylhydrogen end blocked polydimethyl siloxane (having a number average DP of 15, neglecting the end groups) was then added dropwise via an addition funnel.

After about the first 5 grams of the siloxane was added, about 0.4 gram of platinum catalyst (1,3-diethenyl-1,1,3,3-tetramethyldisiloxane platinum complex in dimethyl siloxane) was added to the mixture. The siloxane addition was completed and then a further 0.2 gram of catalyst was added. The molar ratio of total silicone (here siloxane) SiH to total diamide vinyl added was 1.0:1.0.

Following the charging of the flask, the reactants were mixed for about 30 minutes to 1 hour allowing the reaction to take place. The reactor was then heated to 150° C. and a vacuum was applied slowly then gradually increased to below 10 mm Hg to remove the solvent.

Example 2

Effect of Diamide Stripping Conditions

Silicone-diamide copolymers were prepared according to Example 1 with the diamide product stripping conditions given in Table IIA below. The acid and base numbers given in this same table indicate what was required to neutralize (at least) residual UDA and residual HMDA (including for this purpose the portion of monoamide monoamine that titrates) in the diamide, respectively, which is indicative of the degree of completion of the reaction forming the diamide. Amounts of monoamide and total chain terminators in the diamide were determined. The molecular weight of the corresponding copolymer formed from these diamides (and siloxanes) is also presented in Table IIA.

TABLE IIA

Summary of Stripping Results

| Run | Stripping Temp (° C.), Time (hr) | Acid No. (g equiv KOH/kg diamide) | Base No. (g equiv HCl/kg diamide) | Monoamide (mole % in diamide) | Total Chain Terminators (mole % in diamide) | MW of Copolymer |
|---|---|---|---|---|---|---|
| A | 220, 1 | 2.46 | 0.146 | 1.85 | 3.82 | 38860 |
| B | 220, 2 | 0.65 | 0.109 | 1.80 | 2.32 | 80930 |
| C | 240, 2 | 0.45 | 0.073 | 1.49 | 1.82 | 132700 |
| D | 260, 2 | 0.22 | 0.073 | 1.38 | 1.55 | 186400 |

Other silicone-diamide copolymers were prepared using diamides with varying amounts of residual acid and base. The results are summarized in Table IIB.

TABLE IIB

Summary of Other Residual Acid/Base Number Results

| Run | Acid No. (g equiv KOH/kg diamide) | Base No. (g equiv HCl/kg diamide) | MW of Copolymer |
|---|---|---|---|
| E | 5.59 | 0.29 | 14710 |
| F | 5.10 | 0.41 | 17400 |
| G | 3.25 | 0.26 | 31480 |
| H | 0.22 | 0.50 | 193700 |
| I | 0.13 | 0.68 | 208000 |

Example 3

Effect of Level of Monoamide/Chain Terminators

Diamides characterized by the following monoamide content (as determined by Electron Spray Ionization Mass Spectrometry) were used to make copolymers according to Example 1. The results are summarized in the table that follows. Corresponding acid numbers and total chain terminator compositions are given also.

TABLE III

Summary of Results from Example 3

| Sample | Acid No. (g equiv KOH/kg diamide) | Monoamide (mole % in diamide) | Total Chain Terminators (mole % in diamide) | MW Copolymer | Viscosity cP (mPa s) at 140 deg C. |
|---|---|---|---|---|---|
| J | 1.20 | 0.67 | 1.70 | 225200 | 40000 |
| K | 0.67 | 1.46 | 2.00 | 125100 | 37200 |
| L | 2.24 | 1.77 | 3.57 | 53430 | 7640 |
| M | 6.20 | 1.86 | 6.80 | 50110 | 7000 |
| N | 16.20 | 3.34 | 16.10 | 21990 | 1000 |

Example 4

Effect of Blending Diamides with High and Low Monoamide/Terminator Levels

Diamides as characterized in the table below were used in making copolymers according to Example 1, except that toluene was used as a solvent. The results are summarized in the following table.

TABLE IV

Summary of Results from Example 4

| Diamide | Monoamide (mole % in diamide) | Total Chain Terminators (mole % in diamide) | MW of Copolymer |
|---|---|---|---|
| P | 1.05 | 1.2 | above 300000 |
| Q | 2.01 | 3.2 | 54300 |
| R, blend of 50 weight percent each of P and Q | 1.52 | 2.1 | 178700 |

Example 5

Effect of Molar Ratio of Silicone SiH to Diamide Vinyl

Siloxane-diamide copolymers were made according to Example 1 (using the same lot of diamide), except that the molar ratio of silicone SiH to diamide vinyl (carbon-carbon double bond), here terminal vinyl, was varied as shown in the table below. Resulting molecular weights of the copolymers are given in the following table.

TABLE V

Results for Example 5

| Run | Molar Ratio of Silicone SiH:Diamide Vinyl | MW of Copolymer |
|---|---|---|
| S | 0.9:1 | 43,100 |
| T | 1.0:1 | 137,900 |
| U | 1.1:1 | 54,500 |

Example 6

Effect of Decreasing Solvent Level

Copolymers were prepared according to Example 1, but the amount of solvent (here xylene) was varied. The "solvent level" as stated is the ratio of the mass of solvent to that of diamide in the copolymerization. The results are given in the table below.

TABLE VI

Summary of Results from Example 6

| Run | Solvent Level | MW of Copolymer | Melt Viscosity cP (mPa s) at 140 deg C. |
|---|---|---|---|
| V | 2 | 135,800 | 24,200 |
| W | 1 | 163,900 | 30,500 |
| X | 0.5 | 205,700 | 60,100 |
| Y | 0.5 | 198,500 | 56,400 |
| Z | 0 | 82,900 | 17,500 |

Example 7

Effect of Mixing in Solventless Systems a. Lab Scale, Low Shear (no scraping)

About 50 grams of diamide made according to Example 1 and 143 grams of siloxane were loaded into a 500 ml flask and heated to 140° C. About 0.6 gram of platinum catalyst (1,3-diethenyl-1,1,3,3-tetramethyldisiloxane platinum complex in dimethyl siloxane) was then added. The reaction mixture was mixed by an electric stirrer (Cole Palmer Series 4401) at 300 rpm for 1 hour, followed by application of vacuum (10 mm Hg) for about 5 minutes to remove any bubbles. The final copolymer was opaque and had a MW of 69,320.

b. Larger than Lab Scale, Low Shear (no scraping) &
c. Larger than Lab Scale, High Shear (scraping)

Approximately 14 lbs (6.36 kg) of diamide (nominally N,N'-Hexamethylenebis (10-undecenamide)) flake was loaded into a 10 gallon (37.85 l), model PVM, Ross VersaMix® mixer along with approximately 40 lbs (18.18 kg) of dimethylhydrogen end blocked siloxane with a number average DP of 15 (ignoring end groups). The mixer lid was then closed and nitrogen was used to purge the system and was maintained during the run. Agitation was started while the materials in the mixer were heated to about 140° C. At temperature, the material was a creamy yellow, non-homogeneous liquid.

Next, approximately 25 grams of platinum catalyst (1,3-diethenyl-1,1,3,3-tetramethyldisiloxane platinum complex in dimethyl siloxane) was loaded directly to the mixer through a septum using a syringe. Following the catalyst addition, the temperature of the reaction mixture quickly climbed about 30° C. due to the exothermic reaction, and the material in the mixer turned from a creamy yellow to an amber brown color and showed visible signs of thickening. Once the batch temperature had cooled back below 150° C. (after about ½ hr), an additional 25 grams of platinum catalyst was added. This resulted in a temperature increase of about 7° C. The batch temperature was maintained between 140 and 150° C. and held for an additional 2 to 3 hrs. The material was then cooled below 150° C. and poured out of the mixer.

b. (continued) For the larger than lab scale, low shear (no scraping) run, the blade configuration consisted of only one 3-pitch blade that was located on the central agitator shaft. The pitch blades were run at approximately 35 rpm throughout. The final copolymer produced was cloudy and had a MW of 67,130 and a melt viscosity of 14,500 cP (mPa s) at 140° C.

c. (continued) For the larger than lab scale, high shear run, the blade configuration consisted of a low shear anchor-agitator that scraped the sides of the mixer, a small 6-pitch blade, and a high-speed disperser blade each located on a separate agitator shaft. The anchor blade was run between 20 and 30 rpm throughout the process. The cowles and small pitch blades were turned on after the second catalyst addition and remained at approximately 600 rpm for the remainder of the run. A nearly clear copolymer was produced with a molecular weight of 92,450 and a melt viscosity of 45,600 cP (mPa s) at 140° C.

TABLE VII

Results from Example 7

| Run | MW of Copolymer | Color |
|---|---|---|
| A | 69,320 | opaque |
| B | 67,130 | cloudy |
| C | 92,450 | nearly clear |

Example 8

Effect of Solvent Level/Different Solvent Type

About 50 gram of diamide made according to Example 1 was loaded into a 500 ml flask along with the type and amounts of solvent as given in the Table VIII below. The mixture was then heated to about 132 deg C. About 140.4 grams of a dimethylhydrogen end blocked siloxane having a number average DP of 15 (ignoring end groups), was slowly added to the diamide mixture along with 0.6 gram of platinum catalyst of Example 1. The results are given in Table VIII immediately below. PPG3 is PPG-3 Myristyl Ether (a polypropylene glycol ether of myristyl alcohol) made by Goldschmidt.

A copolymer prepared under these conditions except with xylene as a solvent (20.8 weight percent of the reaction mixture) had a molecular weight of 133,700. (The polymer made in xylene was stripped of solvent before molecular weight determination, while those made in PPG3 were not; this is not believed to have any significant effect.)

TABLE VIII

Results from Example 8

| Run | PPG3 (g) | PPG3 weight % of reaction mixture | MW of Copolymer |
|---|---|---|---|
| DD | 25 | 11.6 | 135,400 |
| EE | 50 | 20.8 | 131,000 |
| FF | 100 | 34.4 | 97,970 |

Example 9

Prediction of Copolymer Number Average Molecular Weight by a System Model

Various copolymers were prepared according to Example 1, except that the copolymerization ratios of the silicone (siloxane) and organic (diamide) intermediates were varied as indicated in the table below; organic intermediate used was from the same lot, so chain terminator level was constant. The number average molecular weight of the copolymers formed was measured via gel permeation chromatography (GPC) and also predicted by Equation (IV). The same procedure was repeated using an organic (diamide) intermediate from a different lot. The results are summarized in the tables immediately following. It is of note that the largest errors occur as the ratio of the intermediates approaches 1 which is as $n_{excess}$ approaches zero in the model (Equation (IV)).

TABLE IXA

Results of Number Average Molecular Weight Prediction
(Lot 1 diamide, n terminator = 2.95 mole % of diamide)

| Run | Moles silicone SiH: Moles diamide vinyl | $MW_n$ Experimental (+/− 2,000) | $MW_n$ Predicted | $MW_n$/ Error/ |
|---|---|---|---|---|
| GG | 1.09:1 | 14,200 | 14,800 | 600 |
| HH | 0.99:1 | 15,200 | 19,800 | 4,600 |
| II | 0.94:1 | 13,300 | 12,300 | 1,000 |
| JJ | 0.90:1 | 11,300 | 8,700 | 2,600 |
| KK | 0.70:1 | 6,750 | 3,600 | 3,150 |

TABLE IXB

Results of Number Average Molecular Weight Prediction
(Lot 2 diamide, n terminator = 2.06 mole % of diamide)

| Run | Moles silicone SiH: Moles diamide vinyl | MWn Experimental (+/− 2,000) | MWn Predicted | MW$_n$/ Error/ |
|---|---|---|---|---|
| LL | 1.09:1 | 12,700 | 15,400 | 2,700 |
| MM | 0.99:1 | 17,900 | 22,200 | 4,300 |
| NN | 0.94:1 | 15,300 | 13,200 | 2,100 |
| OO | 0.90:1 | 12,900 | 9,200 | 3,700 |
| PP | 0.70:1 | 6,800 | 3,700 | 3,100 |

Example 10

Effect of Intentional Doping of Diamide with Chain Terminator (End Capping)

A silicone diamide copolymer was prepared as in Example 1, except that in the preparation of the diamide, 222.6 g of UDA, 3.8 g of undecanoic acid (1.7 mole percent of the total carboxylic acid) and 100 g of HMDA were used and the product was stripped for 3 hrs at 240° C. The acid and base numbers of the diamide product were 0.11 and 0.073, respectively, the silicone SiH: diamide vinyl molar ratio in the copolymerization was 1.0:1.0 and the copolymer had a MW of 148,300.

Comparative Examples

Titles given for these comparative examples should not be interpreted as limiting in any way.

Comparative Example 1

Silicone-diamide copolymer (made using a 15 number average DP silicone intermediate) according to Example 1 of U.S. Pat. No. 6,051,216 that features protecting groups.

A 3000 ml three neck flask equipped with a thermometer, electrical stirrer and a condenser was charged with 1427.2 g of dimethylcyclosiloxanes, 172.8 g of tetramethyldihydrogen disiloxane and 1.3 g of trifluoromethane sulfonic acid. The flask was heated to 80 degrees C. and kept at this temperature for 4 hours. After 4 hours, 25 g of sodium bicarbonate were added and the contents of the flask were mixed at 80 degrees C. for another 2 hours. The reaction product (15 DP dimethylhydrogen end blocked polydimethyl siloxane with end groups ignored in DP determination) was filtered using a 0.8 micron filter paper.

To a 2000 ml flask equipped with a thermometer, electrical stirrer, condenser and nitrogen purge were added 800 g of the above product (15 DP dimethylhydrogen end blocked polydimethyl siloxane) and a sufficient amount of a neutralized complex of platinous chloride and divinyl tetramethyl disiloxane was added to provide a concentration of 5–15 ppm Pt metal based on the total composition. The mixture was heated to 80 degrees C. while mixing. In an addition funnel were placed 325.0 g of trimethylsilyl protected undecylenic acid; the material was added dropwise to the reactor and an exotherm was observed. After complete addition the temperature was increased to 110 degrees C. and the mixture was allowed to react for an additional hour. The temperature was then raised to 150 degrees C. under a vacuum for approximately 1 hour. The vacuum was removed and the reactor was allowed to cool below 60 degrees C. Once below 60 degrees C., 110.0 g of methanol were added to the reactor and the temperature set at 60 degrees C. After 2 hours the temperature was increased to 150 degrees C. under vacuum to remove residual methanol and trimethylmethoxysilane.

To a 500 ml flask equipped with a thermometer, electrical stirrer, condenser, nitrogen purge and a Dean Stark trap were added 100 g of the product (15 DP carboxylic acid end blocked siloxane), 20 g of toluene and 7.19 g of hexamethylenediamine. The reactor temperature was increased to 150 degrees C. for 4 hours. During the reaction, water and toluene were periodically removed from the Dean Stark trap. The final silicone polyamide was poured off at approximately 150 degrees C. while still in the melt form. This copolymer had a molecular weight of 20,380 (corresponding to a number average molecular weight of 8,900).

Comparative Example 2

Silicone-diamide copolymers (made using a 15 DP silicone intermediate) according to Example 3 of U.S. Pat. No. 5,981,680.

A 500 ml three neck flask equipped with a thermometer, electrical stirrer, nitrogen sweep, and a condenser, was charged with 57.75 g of undecylenic acid (UDA), and 24.77 g of a 70 weight percent hexamethylene diamine mixture in water (HMDA). The flask was immediately heated to 225 degrees C., and kept at this temperature for 2 hours. After 2 hours, a vacuum was applied to the system for 2 hours to remove any unreacted materials. Upon completion of vacuum stripping, the flask was reweighed to obtain the product weight. The temperature was increased to 120 degrees C., and 65 g of toluene, and 0.5 g of a solution containing platinum in the form of a complex of platinous chloride and divinyl tetramethyl disiloxane were added to the flask. The temperature was then increased to 185 degrees C., and 168.72 g of a 15 DP dimethylhydrogen end blocked polydimethylsiloxane (DP determined ignoring the end groups) was added to the flask over a 30 minute period. After complete addition, a dean stark trap was used to replace the addition funnel on the flask, and the toluene was removed from the flask. After removal of the toluene, the materials were allowed to react for an additional period of one hour. Vacuum stripping was applied to the flask for 1 hour to ensure complete removal of any residual solvent. The final siloxane-based polyamide was cooled to 150° C. and poured off while still in the melt form. This copolymer had a molecular weight of 52,660 and a polydispersity of 3.769. The molar ratio of total silicone SiH: total diamide vinyl in the copolymerization was estimated at about 0.84:1.0 and chain terminators were not measured, modified nor controlled.

When this procedure was repeated using UDA and HMDA from various lots, the molecular weight of the copolymers obtained varied from 7,400 to 50,100.

Comparative Example 3

Silicone-diamide copolymer (made using a 15 number average DP silicone intermediate) according to Example 3 of U.S. Pat. No. 5,981,680 but with chain terminators measured.

A silicone-diamide copolymer was made according to the method of Comparative Example 2. The total silicone SiH: total diamide vinyl molar ratio in the copolymerization was estimated at 0.84:1.0, and the chain terminators were measured at 9.37 mole percent of the diamide used in the copolymerization. The chain terminators were and not modified nor controlled for the copolymerization. The resulting polymer had a molecular weight of 26,400.

The specific embodiments of the present invention described herein are meant to be illustrative. Thus, the scope of the claims should not be taken to be limited to these embodiments, unless specifically stated.

That which is claimed is:

1. A method for making siloxane-based polyamides comprising:

reacting an omega-olefinic carboxylic acid with a diamine to form a vinyl terminated diamide, processing the vinyl terminated diamide to remove species that act as chain terminators in the copolymerization of siloxanes and diamides such that the total chain terminators range from 1–3 mole percent of the processed vinyl terminated diamide. copolymerizing, in the presence of a catalyst, an SiH containing siloxane and the processed vinyl terminated diamide wherein the molar ratio of the SiH containing siloxane added to the processed vinyl terminated diamide is 0.9:1 to 1.1:1.

2. The method according to claim 1, wherein the diamide, the siloxane and the catalyst are mixed during copolymerization which is carried out solventless.

3. The method of claim 1, wherein a solvent comprising toluene, xylene, decamethylcyclopentasiloxane, phenyl tris(trimethylsiloxy)silane, a polypropylene glycol ether of a linear alcohol, or a combination of two or more of these is present during copolymerization.

4. The method of claim 1, wherein the molar ratio of the SiH containing siloxane added to the processed vinyl terminated diamide added is 0.95:1 to 1.05:1.

5. The method of claim 1, wherein the molar ratio of the SiH containing siloxane added to the processed vinyl terminated diamide added is 0.99:1 to 1.01:1.

6. The method of claim 1, where the SiH containing siloxane and the processed vinyl terminated diamide are such that the siloxane based polyamide resulting comprises:

Formula A

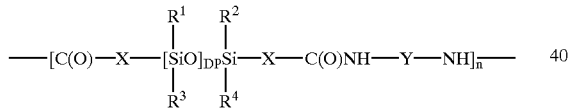

where:

(1) DP is 1–700;
(2) n is a 1–500;
(3) X is a divalent, aliphatic hydrocarbon group having 1–30 carbons;
(4) Y is
   (a) a divalent hydrocarbon group having 1–40 carbons, wherein the hydrocarbon group may optionally and additionally be substituted by at least one member selected from the group consisting of (i) hydroxy; (ii) a C3–C8 cycloalkyl; (iii) 1–3 members selected independently from the group consisting of C1–C3 alkyls and phenyl optionally substituted by 1–3 members selected independently from the group consisting of C1–C3 alkyls; (iv) a C1–C3 hydroxy alkyl; and (v) a C1–C6 alkyl amino, and the hydrocarbon group may optionally and additionally contain at least one of (i) 1–3 amide linkages; (ii) a C5 or C6 cyclic, divalent, saturated hydrocarbon group; and (iii) a phenylene optionally substituted by 1–3 members selected independently from the group consisting of C1–C3 alkyls, or
   (b) $R^{20}T(R^{21})R^{22}$, where $R^{20}$ and $R^{22}$ are divalent C1–C10 hydrocarbon groups and $R^{21}$ is a monovalent or divalent C1–C10 hydrocarbon group, such groups being independent of one R another, and T is C(R), where is selected from hydrogen, $R^1$, $R^2$, $R^3$, $R^4$, or a trivalent N, P or Al; and (5) Each of $R^1$, $R^2$, $R^3$ and $R^4$ is independently selected from the group consisting of methyl, ethyl, propyl, isopropyl, a siloxane chain, and phenyl, wherein the phenyl may optionally be substituted at 1–3 positions by substituents independently selected from the group consisting of methyl and ethyl.

7. The method of claim 1, where the SiH containing siloxane and the processed vinyl terminated diamide are such that the siloxane based polyamide resulting comprises:

Formula I

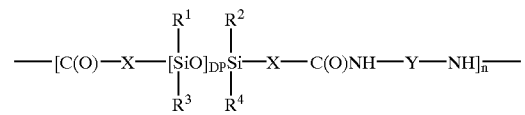

where:

(1) DP is 10–50;
(2) n is 45 or greater;
(3) X is a divalent aliphatic hydrocarbon group having 1–30 carbons;
(4) Y is
   (a) a divalent hydrocarbon group having 1–40 carbons, wherein the hydrocarbon group may be optionally and additionally substituted by at least one member selected from the group consisting of (i) hydroxy; (ii) a C3–C8 cycloalkyl; (iii) 1–3 members selected independently from the group consisting of C1–C3 alkyls and phenyl optionally substituted by 1–3 members selected independently from the group consisting of C1–C3 alkyls; (iv) a C1–C3 hydroxy alkyl; and (v) a C1–C6 alkyl amino, and the hydrocarbon group may optionally and additionally contain at least one of (i) 1–3 amide linkages; (ii) a C5 or C6 cyclic, divalent, saturated hydrocarbon group; and (iii) a phenylene optionally substituted by 1–3 members selected independently from the group consisting of C1–C3 alkyls, or
   (b) $R^{20}T(R^{21})R^{22}$, where $R^{20}$ and $R^{22}$ are divalent C1–C10 hydrocarbon groups and $R^{21}$ is a monovalent or divalent C1–C10 hydrocarbon group, such groups being independent of one another, and T is C(R), where R selected from hydrogen, $R^1$, $R^2$, $R^3$, $R^4$, or a trivalent N, P or Al; and (5) Each of $R^1$, $R^2$, $R^3$, and $R^4$ is independently selected from the group consisting of methyl, ethyl, propyl, isopropyl, a siloxane containing chain, and phenyl, wherein the phenyl may optionally be substituted at 1–3 positions by substituents independently selected from the group consisting of methyl and ethyl.

* * * * *